Aug. 19, 1952    H. C. RUBLY    2,607,092
CLAMP FOR CYLINDRICAL OBJECTS
Filed Dec. 15, 1949    3 Sheets-Sheet 1
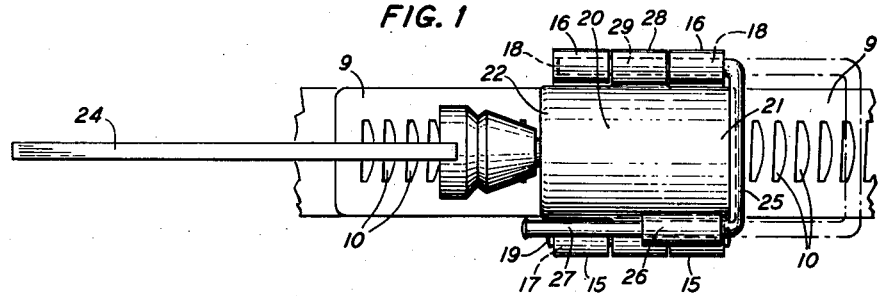
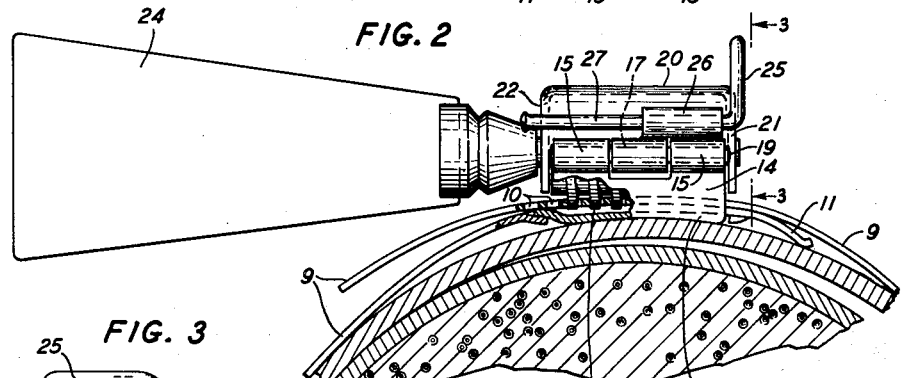
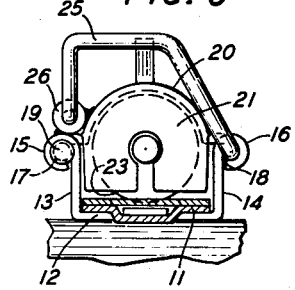
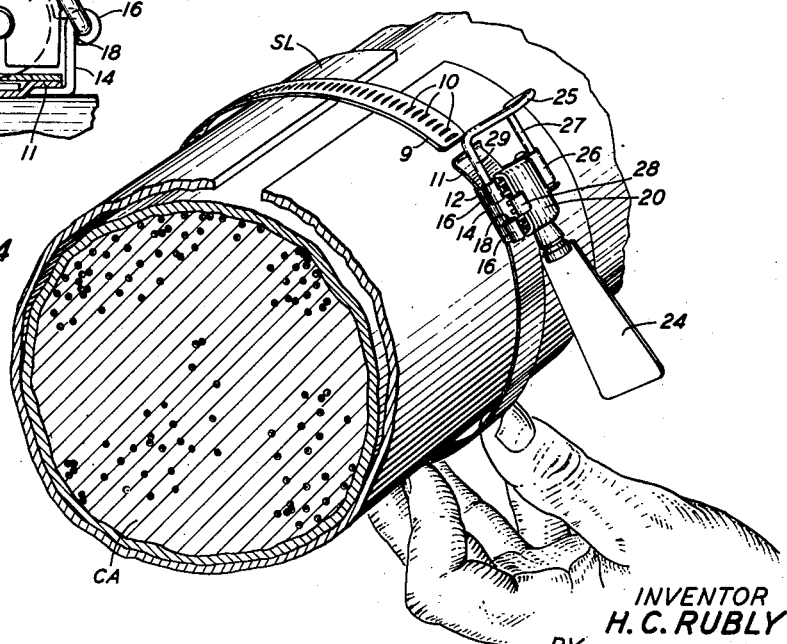
INVENTOR
H. C. RUBLY
BY
ATTORNEY

INVENTOR
H. C. RUBLY
BY
ATTORNEY

Aug. 19, 1952 H. C. RUBLY 2,607,092
CLAMP FOR CYLINDRICAL OBJECTS
Filed Dec. 15, 1949 3 Sheets-Sheet 3

INVENTOR
H. C. RUBLY
BY
ATTORNEY

Patented Aug. 19, 1952

2,607,092

UNITED STATES PATENT OFFICE 2,607,092

CLAMP FOR CYLINDRICAL OBJECTS

Harry C. Rubly, Millburn, N. J., assignor to Bell Telephone Laboratories, Incorporated, New York, N. Y., a corporation of New York Application December 15, 1949, Serial No. 133,141

3 Claims. (Cl. 24—19)

This invention relates to clamping devices and more particularly to an adjustable clamp of the flexible encircling band type intended for exerting uniform pressure on a cylindrical object.

One object of this invention is the provision of a flexible band clamp which may be quickly adjusted to fit the object which it surrounds, prior to its finally being secured in place.

Heretofore in clamps of the flexible encircling band type, for example, such as those shown in Patents 2,386,629, October 9, 1945, and 2,395,273, February 19, 1946, it has been necessary when applying the clamp to cylindrical objects such as pipes, hoses, etc., in the ends thereof are connected to various pieces of equipment, to disengage the free end of the band from the securing member on the other end of the band, place the band in position around the object to be clamped, insert the free end of the band in the securing means and operate securing means to tighten the band.

In order to reduce the number of sizes of clamps required, it is desirable that the bands be of such a length that they will accommodate a wide range of diameters of cylindrical objects. However, when the length of the band is somewhat greater than the circumference of the object to be clamped it is a tedious operation to operate the securing means to draw the band into contact with the object prior to the band actually constricting the object and exerting force thereon. It is therefore desirable that means be provided for making an initial quick adjustment of the band so that it may be readily brought into contact with the object and adjusted before the means for tightening the band is operated.

The clamping device of this invention is intended to surround and exert uniform pressure on the periphery of a cylindrical object and comprises a flexible perforated metallic band having one free end. The other end is provided with a saddle member having a hinged housing in which is rotatably mounted a worm which is arranged to engage the perforations in the metallic band and cause it to constrict when the worm is turned. The hinged housing has locking means associated therewith which permits the housing to be opened, thereby disengaging the worm from the perforations in the band and permitting the band to be slid along in the saddle in either direction to provide rough preliminary adjustment of the band. The housing may be then forced down to cause the worm to engage the perforations in the metal band and be locked in position by a locking means which is slidably mounted thereon.

Referring now to the drawing:

Fig. 1 is a plan view of the band securing means with a portion of the encircling band positioned therein, and the securing means closed and locked;

Fig. 2 is a fragmentary view of a cable with the band securing means, disclosed in Fig. 1, shown in elevation with portions broken away to show the worm cooperating with the perforations in the band;

Fig. 3 is an end elevational view partly in section taken along the line 3—3 of Fig. 2, and in the direction of the arrows;

Fig. 4 is a perspective view, partly in section, of a fragment of a cable and an encircling sleeve with the clamp of this invention in its initial position and the band securing means open;

Figure 5:
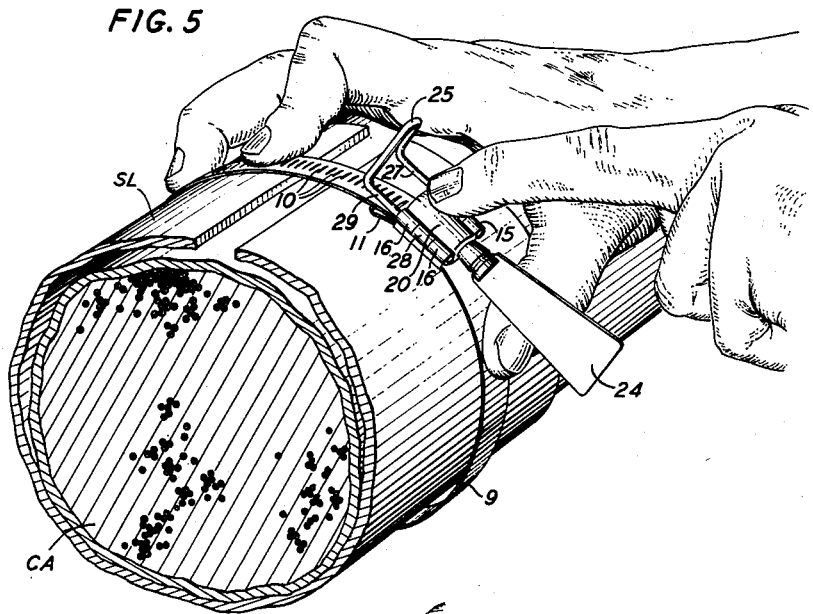
Fig. 5 is a view similar to Fig. 4 and shows the free end of the band inserted in the securing means prior to the closure thereof.

As shown in the various figures of the drawings, one preferred embodiment of my invention comprises a flexible metal band 9 having a plurality of equally spaced transverse perforations 10 located along a portion of its length. The end 11 of the band 9 is rigidly secured to the bottom portion of a saddle member 12, which has a substantially U-shaped cross section and is provided on the top of its upwardly extending walls 13 and 14 with longitudinally extending returnbend portions 15—15 and 16—16 to provide the central bores 17—17 and 18—18.

As shown in the various figures of the drawing and more in detail in Figs. 1, 2 and 3 there is hingedly mounted in the bores 17—17 of the portion 15—15 of the walls 13, by means of the pin 19, a trough shaped housing 20.

Figure 6:
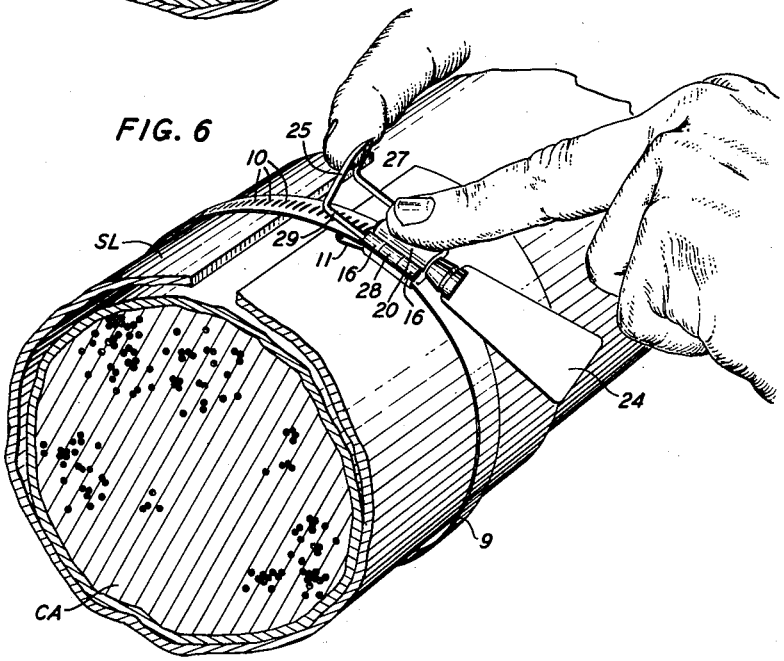
Fig. 6 is a view similar to Fig. 5 and shows the securing means closed down on the band and the locking latch being closed to cause the worm to engage the perforations in the band.

Rotatably mounted in the housing 20 and journaled in the ends 21 and 22 thereof is a worm 23, one end of which extends beyond the end 22 of the housing 20 and has secured thereto a wing portion 24, the rotation of which causes the worm 23 to rotate either in a clockwise or counter-clockwise direction. In its open position the housing 20, as shown in Figs. 4, 5 and 6, is swung upwardly under the influence of the slidable latching member 25, thereby preventing the worm 23 from engaging the perforations 10 in the band 9, thus permitting the free longitudinal movement of the band.

As shown in detail in Figs. 1 and 2, the housing 20 has secured, along one edge thereof, a longitudinally extending sleeve member 26 which has slidably mounted therein the longitudinally extending portion 27 of the latching member 25.

Located on the opposite side of the housing 20 and secured along the edge thereof, midway between the ends 21 and 22, is a sleeve member 28, which when the housing 20 is closed in its normal or operating position, as shown in Figs. 1, 2, 3, 6, 7 and 8, has the bore thereof in register with the bore in the members 16—16 thereby permitting the longitudinally extending portion 29 of the slidable latch 25 to pass therethrough and lock the housing 20 in its closed position with the worm 23 in engagement with the perforations 10 in the band 9, thereby causing any rotatable movement imparted to the worm 23, by means of the wing 24, attached thereto, to be imparted to the band to either expand or constrict depending upon the direction of rotation of the wing 24.

While the clamp of this invention may find a wide field of usefulness and is not intended to be restricted to any specific application, the applicant has found it to be particularly advantageous in the clamping of lead sleeves on communication cables preparatory to soldering the seam in the split sleeve. The following details of operation will be in respect thereto.

In the preparation of splices in telephone cables and the like it is necessary after the individual conductors have been joined together and insulated from each other, to wrap insulating material over the splice and apply a metallic sleeve over the joint which will have its ends beaten down into contact with the cable sheath and solder wiped on each end to prevent the entrance of moisture.

In those instances where it is necessary to use a split sleeve, due to the fact that a regular sleeve cannot be slipped thereover, it is necessary to apply sufficient circumferential pressure to the sleeve to close the split and hold it closed during the soldering operation.

As shown in Fig. 4, the sleeve SL is in position on the cable CA with the band 9 of the clamp encircling it. It will be noted that the band 9 is positioned loosely around the sleeve SL with its free end spaced away from the securing means, which comprises the worm 23, the housing 20, and the other components as heretofore described in the detailed description of the clamping device. As shown, the latching member 25 has been withdrawn thereby permitting the portion 29 thereof to become disengaged from the sleeve 28 on the housing 20 and permitting the housing 20 to rise upwardly, under the influence of the latch 25 and disengage the worm 23 from the perforations 10 in the band 9.

The next step, as shown in Fig. 5, is to press the band 9 firmly into contact with the sleeve SL and position the free end thereof under the housing 20 thereby positioning the band snugly about the sleeve SL.

The third step, as shown in Fig. 6, is to apply pressure to the top of the housing 20 to cause the worm 23 to engage the perforation 10 in the band 9. With the housing down in position and the sleeve 28 thereon in alignment with the bore 18 in the member 16 the latch 25 is pushed inwardly to lock the worm 23 in engagement with the perforations 10 in the band 9.

Figure 7:
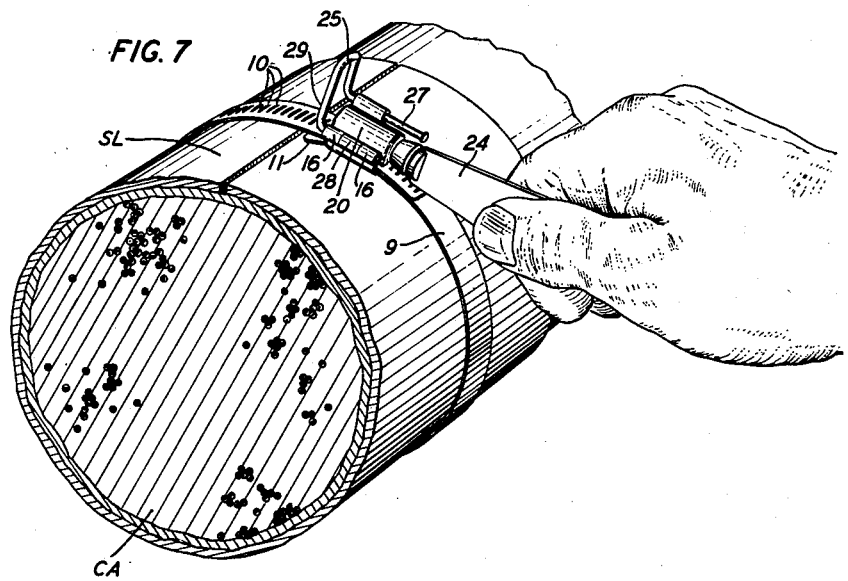
Fig. 7 is a view similar to Fig. 6 and shows the band securing means closed and locked and the worm being operated to constrict the band and force the edges of the split sleeve together.
Figure 8:
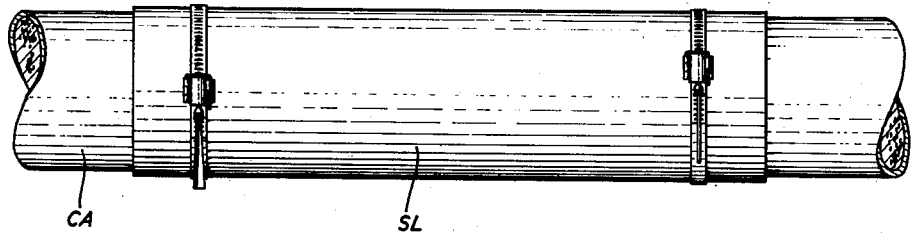
Fig. 8 is a fragment of cable having a sleeve positioned thereon and held in place by a pair of clamps constructed in accordance with the present invention.

The last step, as shown in Fig. 7, is to rotate the wing 24 in a clockwise direction. This causes the worm 23, which is in engagement with the perforations 10 in the band 9, to exert constricting pressure on the band 9 thereby causing the abutting edges of the split sleeve SL to be forced into intimate engagement with each other as shown.

What is claimed is:

1. A clamp for embracing cylindrical objects, comprising a perforated metal band, a separable housing located on said band comprising upper and lower portions, a rotatable worm member journaled in said upper portion and in engagement with the perforations in said band, the upper portion of said housing hingedly supported on said lower portion of said housing along one longitudinally extending edge thereof to permit the worm to be swung radially upward to disengage it from the band, and means in engagement with the upper and lower portions of said housing for locking said upper portion closed to maintain said worm in engagement with the perforations in said band.

2. A clamp for embracing cylindrical objects, comprising a perforated metal band, a separable housing located on one end of said band comprising upper and lower portions, a rotatable worm member journaled in said upper portion and in engagement with the perforations in said band, the upper portion of said housing hingedly supported on said lower portion of said housing along one longitudinally extending edge to permit the worm to be swung radially upward to disengage it from the band, means in engagement with the upper and lower portions of said housing for locking said upper portion closed to maintain said worm in engagement with the perforation in said band, and means on said worm member extending beyond the upper portion of said housing for rotating said worm member.

3. A clamp for embracing cylindrical objects, comprising a metal band having a plurality of transverse perforations along its length, a saddle member secured to one end of said band, a separable housing comprising upper and lower portions, secured to said saddle, the upper portion of said housing hingedly supported along one longitudinal edge thereof, a rotatable worm journaled in the upper portion of said housing in engagement with the perforations in said band, the upper portion of said housing adapted to be swung upwardly to permit the worm to be disengaged from the perforations in the band, and slidable means located along the opposite longitudinally extending edge of said housing and said saddle for maintaining the upper portion of said housing in a closed position with the worm in engagement with the perforations in the band.

HARRY C. RUBLY.

REFERENCES CITED

The following references are of record in the file of this patent:

UNITED STATES PATENTS

| Number | Name | Date |
|---|---|---|
| 493,336 | Mead et al. | Mar. 14, 1893 |
| 737,996 | Bullard | Sept. 1, 1903 |
| 953,766 | Schulte | Apr. 5, 1910 |
| 1,146,995 | Bossert | July 20, 1915 |
| 1,343,006 | Sauvage | June 8, 1920 |
| 1,992,505 | Prosky | Feb. 26, 1935 |
| 2,189,172 | Hathorn | Feb. 6, 1940 |
| 2,268,211 | Hathorn | Dec. 30, 1941 |
| 2,345,832 | Pritchard | Apr. 4, 1944 |
| 2,386,629 | North et al. | Oct. 9, 1945 |
| 2,395,273 | Hill et al. | Feb. 19, 1946 |
| 2,504,836 | Hill | Apr. 18, 1950 |

FOREIGN PATENTS

| Number | Country | Date |
|---|---|---|
| 602,458 | Great Britain | May 27, 1948 |